(12) United States Patent
Kim et al.

(10) Patent No.: US 10,744,968 B2
(45) Date of Patent: Aug. 18, 2020

(54) AIRBAG DEVICE FOR DRIVER

(71) Applicant: HYUNDAI MOBIS CO., LTD., Seoul (KR)

(72) Inventors: Do Hyoung Kim, Yongin-si (KR); Kyu Sang Lee, Yongin-si (KR); Hae Kwon Park, Yongin-si (KR); Seok Hoon Ko, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 61 days.

(21) Appl. No.: 16/102,634

(22) Filed: Aug. 13, 2018

(65) Prior Publication Data

US 2019/0054885 A1 Feb. 21, 2019

(30) Foreign Application Priority Data

Aug. 18, 2017 (KR) .................. 10-2017-0105117

(51) Int. Cl.
  *B60R 21/203* (2006.01)
  *B60R 21/217* (2011.01)
  *B60R 21/00* (2006.01)

(52) U.S. Cl.
  CPC ........ *B60R 21/2035* (2013.01); *B60R 21/217* (2013.01); *B60R 2021/0004* (2013.01)

(58) Field of Classification Search
  CPC .................. B60R 21/2035; B60R 21/217
  See application file for complete search history.

(56) References Cited

U.S. PATENT DOCUMENTS

| | | | | |
|---|---|---|---|---|
| 6,592,141 B1 * | 7/2003 | Dancasius | ........... | B60R 21/2037 280/728.1 |
| 6,679,518 B2 * | 1/2004 | Varcus | ................ | B60R 21/2037 280/728.2 |
| 6,712,383 B2 * | 3/2004 | Asic | .................... | B60R 21/2037 280/728.2 |
| 10,272,871 B2 * | 4/2019 | Kienzner | ............ | B60R 21/2037 |

* cited by examiner

*Primary Examiner* — Paul N Dickson
*Assistant Examiner* — Joselynn Y Sliteris
(74) *Attorney, Agent, or Firm* — H.C. Park & Associates, PLC

(57) ABSTRACT

An airbag device for a driver may include: a plate mounted in a steering wheel; an inflator inserted into the plate; a damper coupled to the plate and the inflator so as to reduce vibration of the inflator; a cage covering the inflator, and mounted on the plate; and a gasket coupled to the cage so as to prevent leakage of the gas provided from the inflator to the outside.

8 Claims, 8 Drawing Sheets

AIRBAG DEVICE FOR DRIVER

CROSS-REFERENCES TO RELATED APPLICATION

The present application claims priority from and the benefit of Korean Patent Application number 10-2017-0105117, filed on Aug. 18, 2017, which is hereby incorporated by reference for all purposes as if set forth herein.

BACKGROUND

Field

Exemplary embodiments relate to an airbag device for a driver, and more particularly, to an airbag device for a driver, which can attenuate vibration, and prevent gas leakage when an airbag is deployed, thereby maintaining pressure.

Discussion of the Background

The airbag system for a vehicle refers to a device that can instantly inflate an airbag (air pocket) between a driver and a steering wheel or between a passenger in a passenger seat and an instrument panel in case of a collision, and thus reduce an injury caused by shock.

Among a variety of airbag systems, an airbag system for a driver in a driver's seat includes an airbag module for a driver, a shock sensor and an electronic control module. The airbag module includes an inflator for generating gas by igniting a detonator, an airbag expanded and deployed toward the driver in the driver seat by the generated gas, a mounting plate having the inflator installed thereon and fixed to a cover member installed on the steering wheel through a bolt or the like, and a horn plate installed at the top of the mounting plate. The shock sensor generates a shock signal in case of a collision. The electronic control module ignites the detonator of the inflator according to the shock signal.

In the related art, a separate damping member is additionally installed between the airbag system and the steering wheel, in order to absorb vibration applied to the airbag system. However, since the area for the installation of the damping member is narrow, it is difficult to assemble the damping member, while the vibration absorption effect is degraded. Furthermore, since a part of the gas provided from the inflator leaks to the outside regardless of the deployment of the airbag, the airbag may not be smoothly deployed. Therefore, there is a demand for a device capable of solving the problem.

The above information disclosed in this Background section is only for enhancement of understanding of the background of the invention and, therefore, it may contain information that does not constitute prior art.

SUMMARY

Exemplary embodiments of the present invention provide an airbag device for a driver, which can attenuate vibration, and prevent gas leakage when an airbag is deployed, thereby maintaining pressure.

In one embodiment, an airbag device for a driver may include: a plate mounted in a steering wheel; an inflator inserted into the plate; a damper coupled to the plate and the inflator so as to reduce vibration of the inflator; a cage covering the inflator, and mounted on the plate; and a gasket coupled to the cage so as to prevent leakage of the gas provided from the inflator to the outside.

The plate may include: a bottom plate having a bottom hole formed in the center thereof; an inner protrusion formed at the inner edge of the bottom plate; and an outer protrusion formed at the outer edge of the bottom plate.

The bottom plate may be coupled to the steering wheel through a bottom plate fastener, and elastically supported through a elastic bottom plate.

The inner protrusion and the outer protrusion may be protruded toward the front surface, and the outer protrusion may have a larger protrusion length than the inner protrusion.

The inflator may include: a gas generator disposed in the center of the bottom plate, and configured to generate gas; and a gas support extended laterally from the gas generator, and coupled to the damper.

The gas generator may be positioned in the bottom hole, the gas support is disposed over the bottom plate, and the inner protrusion may be disposed under the gas support.

The damper may include: a damper body; a damper upper extension extended upward from the damper body; a damper upper insertion formed on the damper upper extension, and disposed through the inflator; a damper lower extension extended downward from the damper body; and a damper lower insertion formed on the damper lower extension, and disposed through the plate.

The damper may further include a damper manipulator extended downward from the damper lower insertion.

The cage may include: a cage plate having a central hole formed in the center thereof; a cage cover formed on the cage plate, and partially covering the central hole to pass gas; and a cage coupler coupling the cage plate and the plate to each other.

The gasket may include: a gasket plate coupled to the bottom surface of the cage plate; and a deformation gasket extended inwardly from the gasket plate, and deformed by the gas pressure so as to block a gap between the inflator and the gasket plate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
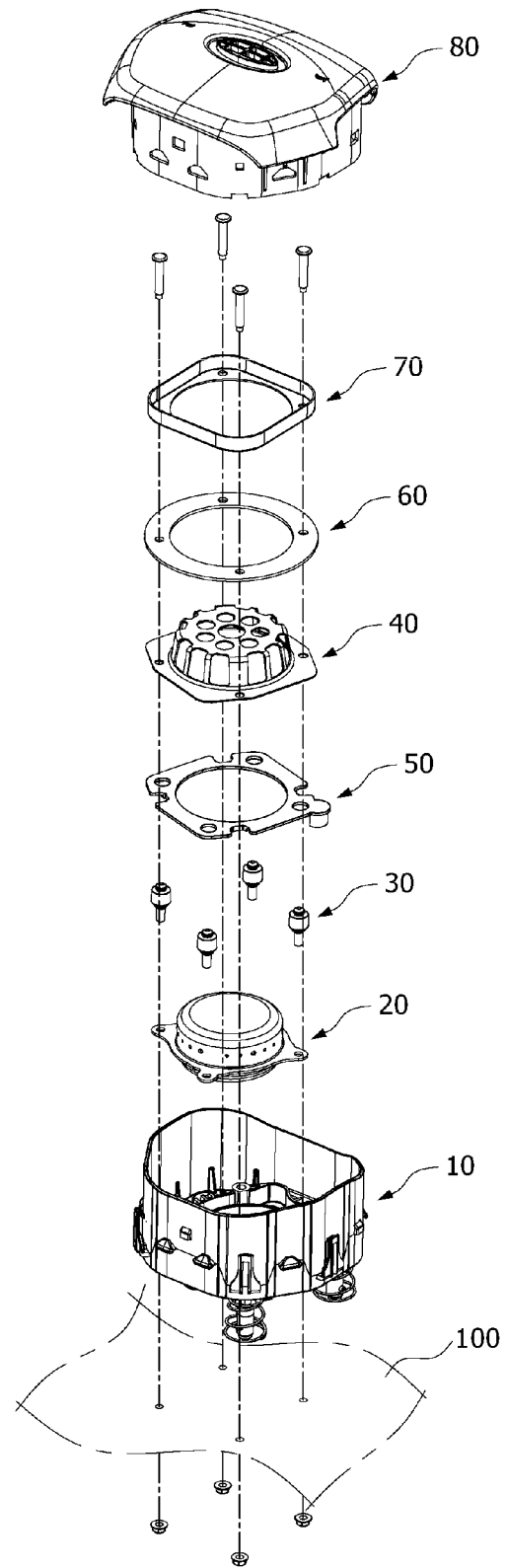
FIG. 1 schematically illustrates an airbag device for a driver in accordance with an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Hereafter, an airbag device for a driver in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

FIG. 1 schematically illustrates an airbag device for a driver in accordance with an embodiment of the present invention. Referring to FIG. 1, the airbag device 1 for a driver seat in accordance with the embodiment of the present invention may include a plate 10, an inflator 20, a damper 30, a cage 40 and a gasket 50.

The plate 10 may be mounted in a steering wheel 100. For example, the top of the plate 10 may be opened, and the plate 10 may be mounted on the front surface of the steering wheel 100 in the driver's seat.

The inflator 20 may be inserted into the plate 10, and serve to generate gas. For example, when a collision is sensed through a collision sensor, the inflator 20 may be operated to discharge gas.

The damper 30 may be coupled to the plate 10 and the inflator 20, in order to reduce vibration of the inflator 20. For example, the damper 30 may be formed of an elastic material such as rubber or silicone, and elastically support the inflator 20.

The cage 40 may be mounted in the plate 10 so as to cover the inflator 20. For example, the cage 40 may be fixed to the plate 10, pass the gas generated by the inflator 20, and provide a flow space for the inflator 20.

The gasket 50 may be coupled to the cage 40, and serve to prevent gas leakage. For example, the gasket 50 may primarily block the gas of the inflator 20 from leaking to the outside. Furthermore, the gasket 50 can prevent noise which may be generated by contact with the plate 10.

The airbag device 1 for a driver seat in accordance with the embodiment of the present invention may further include a cushion 60 for the deployment of the airbag by the gas supplied from the inflator 20, a retainer 70 for constraining the cushion 60 to the plate 10 when the airbag is deployed, and a cover 80 for covering the plate 10. At this time, the retainer 70 may protect the cushion 60 from the gas discharged by the inflator 20, and change the moving direction of the gas. The retainer 70 may constrain the cage 40 and the gasket 50 to the plate 10.

Figure 2:
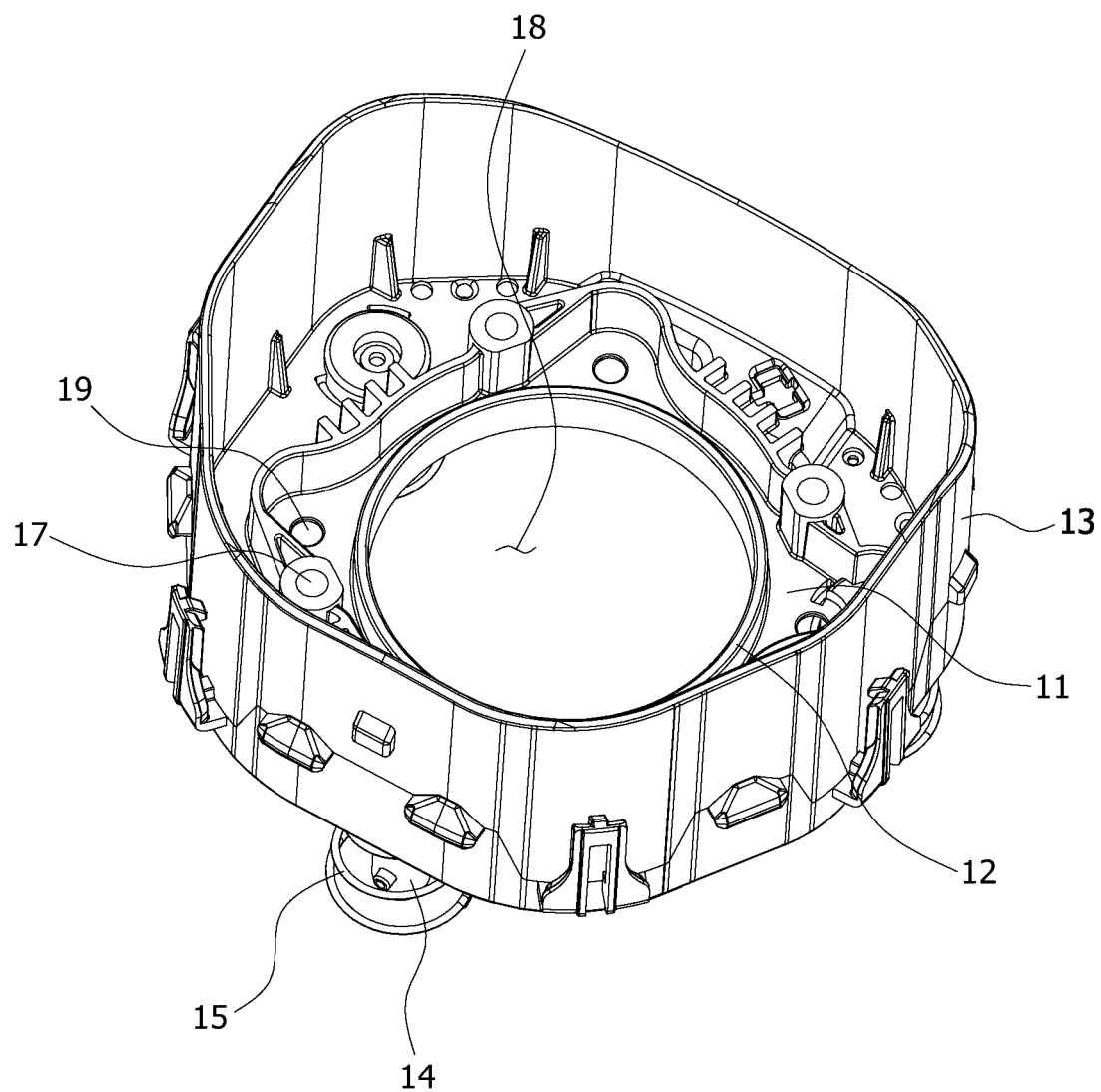
FIG. 2 schematically illustrates a plate of the airbag device for a driver in accordance with the embodiment of the present invention.

FIG. 2 schematically illustrates the plate of the airbag device for a driver in accordance with the embodiment of the present invention. Referring to FIG. 2, the plate 10 in accordance with the embodiment of the present invention may include a bottom plate 11, an inner protrusion 12 and an outer protrusion 13.

The bottom plate 11 may be coupled to the steering wheel 100 through a bottom plate fastener 14, and have a bottom hole 18 formed in the center thereof. The bottom plate 11 may be elastically supported by a elastic bottom plate 15 formed in a coil spring shape.

The inner protrusion 12 may be protruded from the inner edge of the bottom plate 11, and the outer protrusion 13 may be protruded from the outer edge of the bottom plate 11. For example, the inner protrusion 12 and the outer protrusion 13 may be protruded toward the front surface, and the outer protrusion 13 may have a larger protrusion length than the inner protrusion 12.

Figure 3:
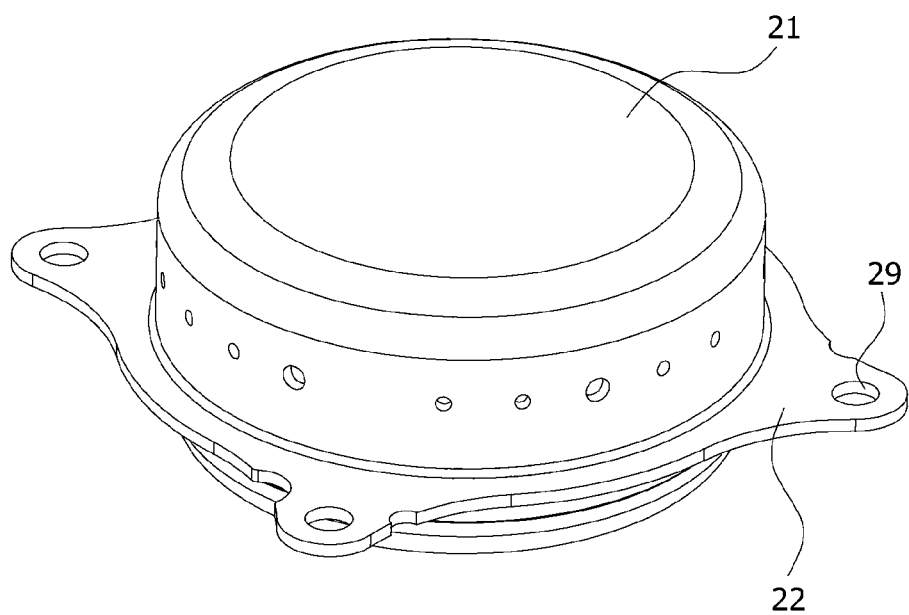
FIG. 3 schematically illustrates an inflator of the airbag device for a driver in accordance with the embodiment of the present invention.

FIG. 3 schematically illustrates the inflator of the airbag device for a driver in accordance with the embodiment of the present invention. Referring to FIG. 3, the inflator 20 in accordance with the embodiment of the present invention may include a gas generator 21 and a gas support 22.

When a collision signal is received, the gas generator 21 may be exploded to generate gas. The gas support 22 may be extended laterally from the gas generator 21, and coupled to the damper 30. For example, the gas generator 21 may be positioned in the bottom hole 18, and the gas support 22 may be disposed over the bottom plate 11. Thus, the inner protrusion 12 may be disposed under the gas support 22.

Figure 4:
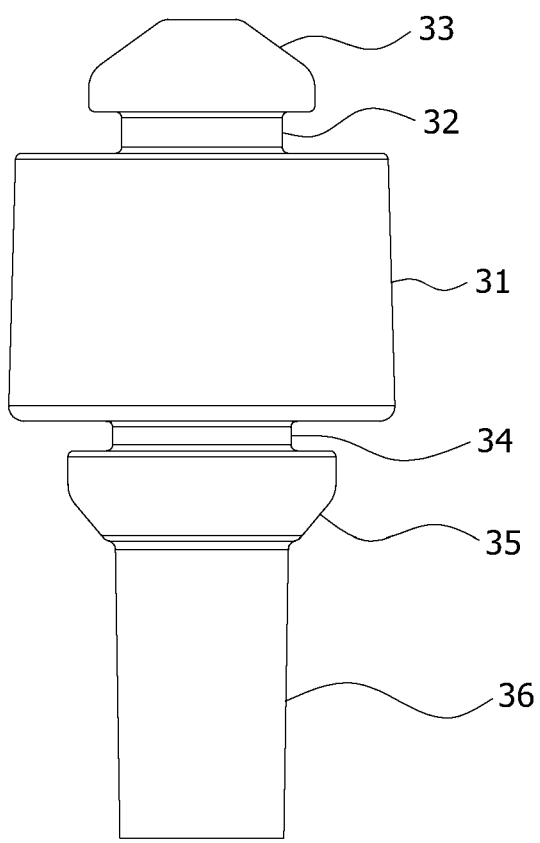
FIG. 4 schematically illustrates a damper of the airbag device for a driver in accordance with the embodiment of the present invention.

FIG. 4 schematically illustrates the damper of the airbag device for a driver in accordance with the embodiment of the present invention. Referring to FIG. 4, the damper 30 in accordance with the embodiment of the present invention may include a damper body 31, a damper upper extension 32, a damper upper insertion 33, a damper lower extension 34 and a damper lower insertion 35.

The damper upper extension 32 and the damper lower extension 34 may be extended from the top and bottom of the damper body 31, respectively. The damper upper insertion 33 may be formed at the top of the damper upper extension 32. The cross-sectional area of the damper upper insertion 33 may be larger than the damper upper extension 32, and decreased toward the top. The damper lower insertion 35 may be formed at the bottom of the damper lower extension 34. The cross-sectional area of the damper lower insertion 35 may be larger than the damper lower extension 34, and decreased toward the bottom.

The damper upper insertion 33 may be disposed through the inflator 20, and the damper lower insertion 35 may be disposed through the plate 10. For example, the damper upper insertion 33 may be disposed through a gas damper hole 29 formed in the gas support 22, such that the gas support 22 is positioned between the damper upper insertion 33 and the damper body 31. The damper lower insertion 35 may be disposed through a bottom plate damper hole 19 formed in the bottom plate 11, such that the bottom plate 11 is positioned between the damper lower insertion 35 and the damper body 31.

The damper 30 may further include a damper manipulator 36. The damper manipulator 36 may be extended downward from the damper lower insertion 35, and an operator may install the damper 30 in the plate 10, holding the damper manipulator 36. When the installation of the damper 30 in the plate 10 is completed, the damper manipulator 36 may be cut and discarded.

Figure 5:
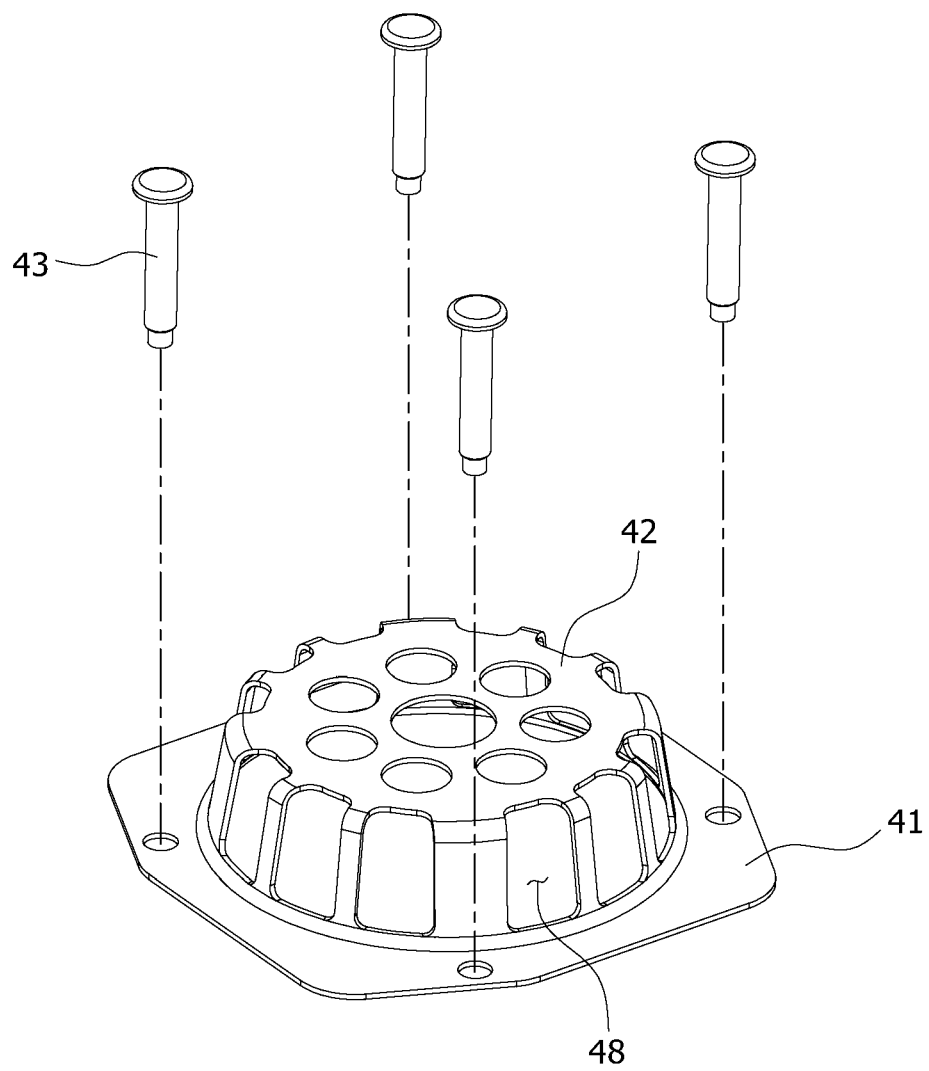
FIG. 5 schematically illustrates a cage of the airbag device for a driver in accordance with the embodiment of the present invention.

FIG. 5 schematically illustrates the cage of the airbag device for a driver in accordance with the embodiment of the present invention. Referring to FIG. 5, the cage 40 in accordance with the embodiment of the present invention may include a cage plate 41 and a cage cover 42.

The cage plate 41 may have a central hole 48 formed in the center thereof. For example, the diameter of the central hole 48 may be set to such an extent that the gas generator 21 can be passed through the central hole 48.

The cage cover 42 may be formed on the cage plate 41, and partially cover the central hole 48 to pass the gas. For example, the cage cover 42 can be extended upward from the cage plate 41 so as to secure the flow space of the gas generator 21, and pass the gas.

The cage plate 41 and the plate 10 may be coupled to each other through a cage coupler 43. For example, the bottom plate 11 of the plate 10 may have a bottom boss 17 formed thereon, and the cage coupler 43 may be fastened to the bottom boss 17 so as to fix the cage plate 41 to the plate 10. At this time, the cage coupler 43 may fix the retainer 70 as well as the cage plate 41.

Figure 6:
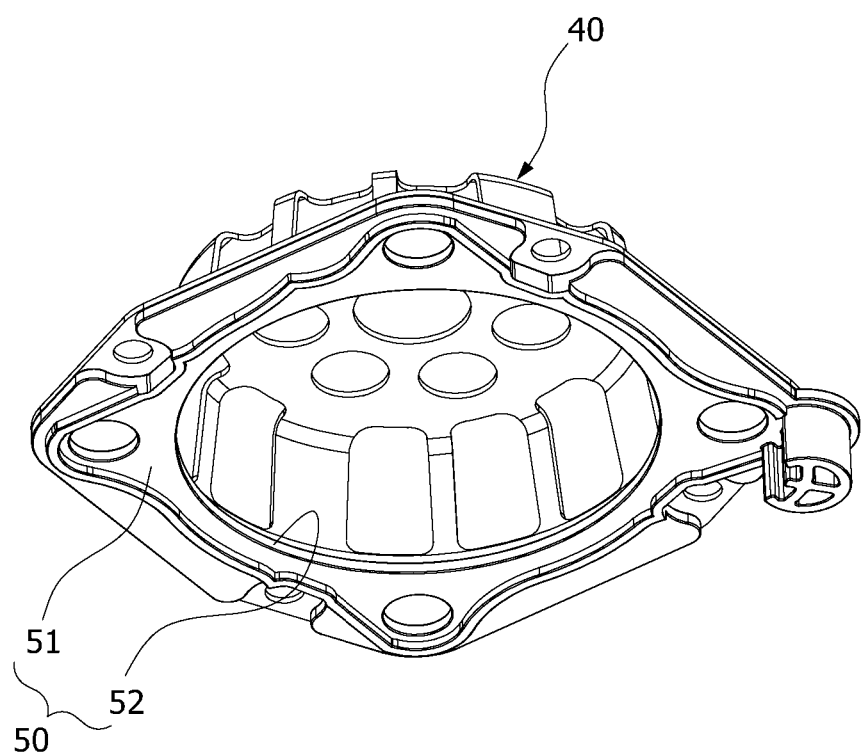
FIG. 6 schematically illustrates a gasket of the airbag device for a driver in accordance with the embodiment of the present invention.

FIG. 6 schematically illustrates the gasket of the airbag device for a driver in accordance with the embodiment of the present invention. Referring to FIG. 6, the gasket 50 in accordance with the embodiment of the present invention may include a gasket plate 51 and a deformation gasket 52. The gasket 50 may be formed of an elastic material, and thus deformed to absorb shock.

The gasket plate 51 may be coupled to the bottom surface of the cage plate 41. For example, the gasket plate 51 may be adhered to the bottom surface of the cage plate 41 through an adhesive. The gasket plate 51 may have a hole formed in the center thereof so as to correspond to the cage plate 41.

The deformation gasket 52 may be extended inwardly from the gasket plate 51, and deformed by gas pressure so as to block a gap between the inflator 20 and the gasket plate 51. For example, the gasket plate 51 and the deformation gasket 52 may be formed as one body.

The assembling process of the airbag device for a driver in accordance with the embodiment of the present invention will be described as follows.

An operator may insert the tops of the plurality of dampers 30 into the gas support 22, in order to fit the dampers 30 to the gas support 22. Furthermore, the operator may insert the bottoms of the dampers 30 into the bottom plate 11, in order to fit the dampers 30 to the bottom plate 11. At this time, the operator may pull the damper manipulators 36 to fit the bottoms of the dampers 30 to the bottom plate 11, and then remove the damper manipulators 36 when the assembling is completed.

When the inflator 20 is disposed in the plate 10 by the dampers 30, the cage 40 having the gasket 50 attached thereon may be positioned above the inflator 20. At this time, the cage 40 may be seated on the bottom boss 17 protruding upward from the bottom plate 11, and the cage 40 may be coupled to the plate 10 by the cage coupler 43 formed in the retainer 70.

Figure 7A:
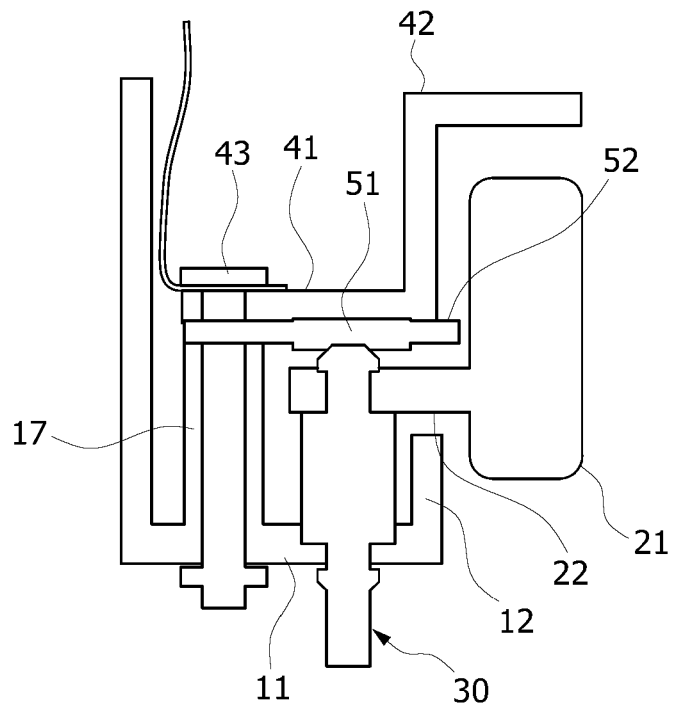
FIGS. 7A and 7B schematically illustrate that gas leakage is primarily prevented in the airbag device for a driver in accordance with the embodiment of the present invention.
Figure 7B:
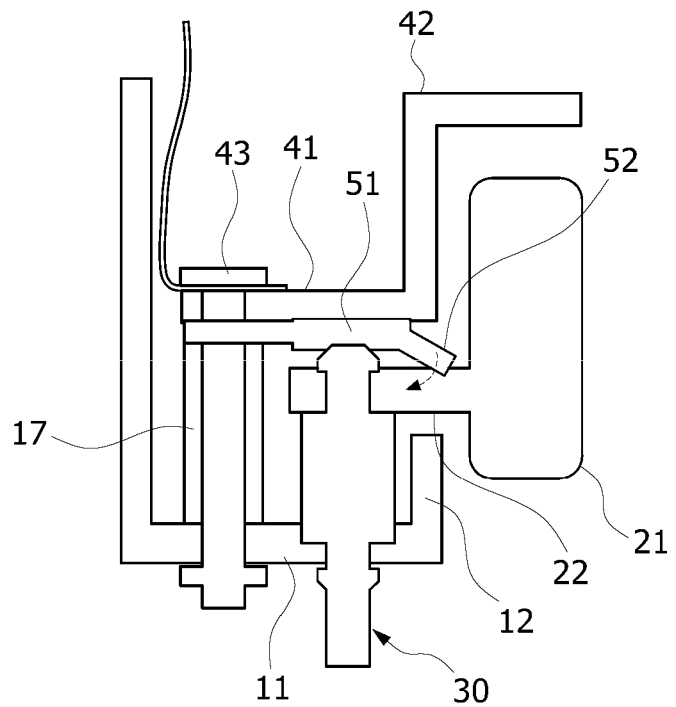
Figure 8A:
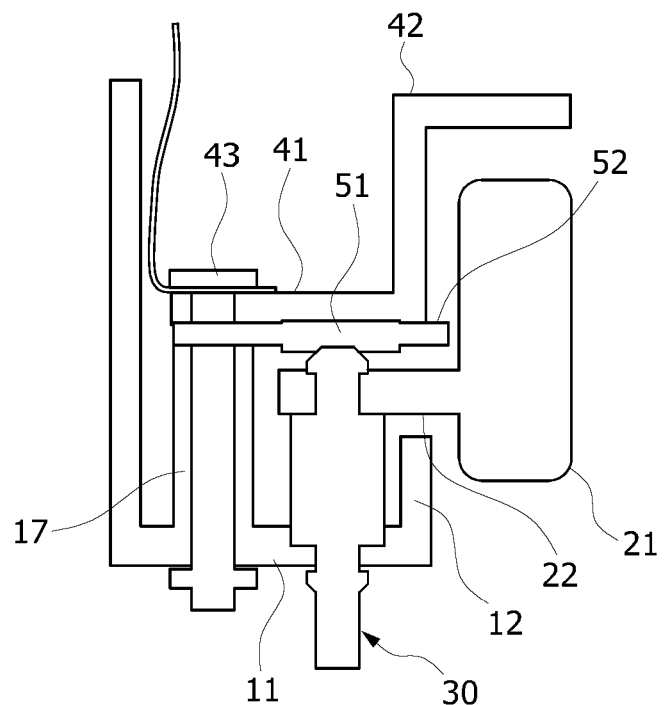
FIGS. 8A and 8B schematically illustrates that gas leakage is secondarily prevented in the airbag device for a driver in accordance with the embodiment of the present invention.
Figure 8B:
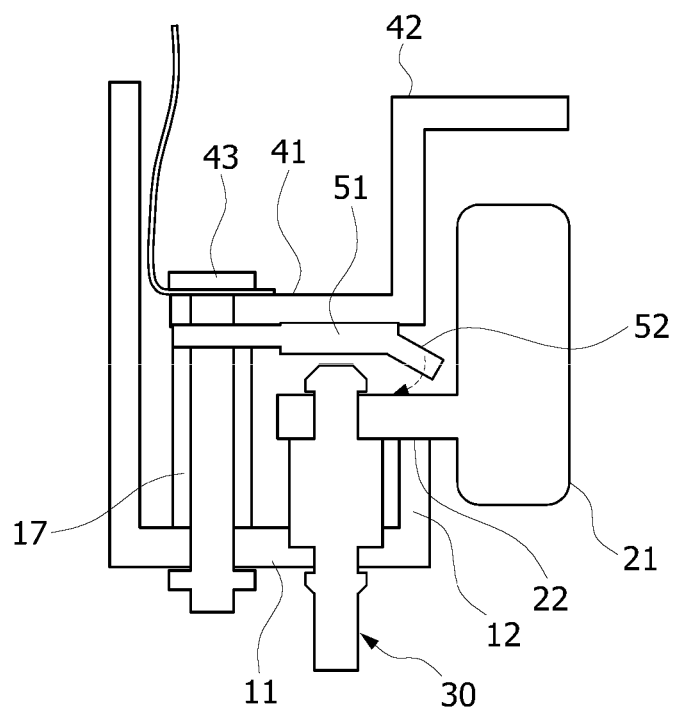

FIGS. 7A and 7B schematically illustrate that gas leakage is primarily prevented in the airbag device for a driver in accordance with the embodiment of the present invention, and FIGS. 8A and 8B schematically illustrate that gas leakage is secondarily prevented in the airbag device for a driver in accordance with the embodiment of the present invention. Referring to FIGS. 7 and 8, the gas leakage prevention process will be schematically described as follows.

When the inflator 20 is operated, gas may be discharged to the outside from the inside of the cage 40, and a pressure difference may occur between the inside and outside of the cage 40. Such a pressure difference may deform the deformation gasket 52 downward such that the deformation gasket 52 is pressed against the gas support 22. When the deformation gasket 52 and the gas support 22 are pressed against each other, gas can be blocked from leaking to the outside from regions other than the cage 40, which makes it possible to stably deploy the airbag (refer to FIG. 7).

When the inflator 20 is operated, the gas generator 21 may be pushed backward by the force of the discharged gas. Thus, a gap may be formed between the deformation gasket 52 and the gas support 22, even though the deformation gasket 52 is deformed. However, the gas support 22 moved backward may be pressed against the inner protrusion 12, thereby preventing gas leakage (refer to FIG. 8).

At this time, the separation distance between the inner protrusion 12 and the gas support 22 may differ depending on the material characteristic of the damper 30. For example, the separation distance may be equal to or more than 1 mm, and less than 30% of the height of the damper body 31.

In the airbag device 1 for a driver seat in accordance with the embodiment of the present invention, the damper 30 can support the inflator 20, and reduce vibration generated during the operation of the inflator 20.

Furthermore, the gasket 50 can be deformed and pressed against the inflator 20 by pressure, thereby preventing gas leakage.

Furthermore, although the inflator 20 is pushed backward when discharging gas, the gas support 22 can be moved backward and pressed against the inner protrusion 12 formed in the plate 10, thereby preventing gas leakage.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An airbag device comprising:
   a plate mounted in a steering wheel;
   an inflator inserted into the plate;
   a damper coupled to the plate and the inflator, and configured to reduce vibration of the inflator;
   a cage covering the inflator, and mounted on the plate; and
   a gasket coupled to the cage, and configured to prevent leakage of gas provided from the inflator to the outside,
   wherein:
   the cage comprises:
      a cage plate having a central hole formed in a center of the cage plate;
      a cage cover formed on the cage plate, and partially covering the central hole to pass gas; and a cage coupler configured to couple the cage plate and the plate to each other; and the gasket comprises:

a gasket plate coupled to a bottom surface of the cage plate; and a deformation gasket extended inwardly from the gasket plate, and configured to be deformed by a gas pressure, and to block a gap between the inflator and the gasket plate.

2. The airbag device of claim 1, wherein the plate comprises:

a bottom plate having a bottom hole formed in a center of the bottom plate;

an inner protrusion formed at an inner edge of the bottom plate; and an outer protrusion formed at an outer edge of the bottom plate.

3. The airbag device of claim 2, wherein the bottom plate is coupled to the steering wheel through a bottom plate fastener, and elastically supported through an elastic bottom plate.

4. The airbag device of claim 2, wherein the inner protrusion and the outer protrusion are protruded away from the steering wheel, and the outer protrusion has a larger protrusion length than a protrusion length of the inner protrusion.

5. The airbag device of claim 2, wherein the inflator comprises:

a gas generator disposed in the center of the bottom plate, and configured to generate gas; and a gas support extended laterally from the gas generator, and coupled to the damper.

6. The airbag device of claim 5, wherein the gas generator is positioned in the bottom hole, the gas support is disposed over the bottom plate, and the inner protrusion is disposed under the gas support.

7. The airbag device of claim 1, wherein the damper comprises:

a damper body;

a damper upper extension extended upward from the damper body;

a damper upper insertion formed on the damper upper extension, and disposed through the inflator;

a damper lower extension extended downward from the damper body; and a damper lower insertion formed on the damper lower extension, and disposed through the plate.

8. The airbag device of claim 7, wherein the damper further comprises a damper manipulator extended downward from the damper lower insertion.

* * * * *